United States Patent [19]

Cline et al.

[11] 4,417,016

[45] Nov. 22, 1983

[54] FROTHING AID COMPOSITION

[75] Inventors: Charles D. Cline, Fountain Inn; Thomas L. Mills, Greenville, both of S.C.

[73] Assignee: Para-Chem Southern, Inc., Greenville, S.C.

[21] Appl. No.: 350,140

[22] Filed: Feb. 19, 1982

[51] Int. Cl.$^3$ ............................ C08K 5/42; C08V 9/30
[52] U.S. Cl. ..................................... 524/156; 252/307; 521/65; 521/70; 521/71; 524/166; 524/221; 524/522
[58] Field of Search ............... 252/307, 357, 354, 356; 521/65, 70, 71; 524/156, 166, 221, 522

[56] References Cited

U.S. PATENT DOCUMENTS

| | | | |
|---|---|---|---|
| 3,538,025 | 11/1970 | Roberts et al. | 521/71 |
| 3,598,742 | 8/1971 | Jamison | 252/91 |
| 4,118,526 | 10/1978 | Gregorian et al. | 427/350 |

*Primary Examiner*—Morton Foelak
*Attorney, Agent, or Firm*—Julian W. Dority

[57] ABSTRACT

An improved frothing aid composition for use in combination with sodium polyacrylate viscosity regulator which consists about 70 to 99% by weight of a surfactant and from about 1 to 30% by weight of a thickener comprising a copolymer of acrylic or methacrylic acid with at least one copolymerizable monomer selected from the group consisting of alkyl acrylates or methacrylates having up to 6 carbons in the alkyl, vinylidene aromatic monomers and aliphatic conjugated diene monomers of 4-10 carbon atoms.

13 Claims, No Drawings

FROTHING AID COMPOSITION

DESCRIPTION

1. Technical Field

This invention relates to an improved frothing aid composition, for use in foaming filler-containing latexes intended for ultimate application to carpet backings, upholstery backings or draperies.

2. Background Art

It has been proposed by Jamison et al., in U.S. Pat. No. 3,598,742, to produce a stable foam from a mixture of fibrous material, a wetting agent, water, a thickening material and a dispersion of a film formable, water-insoluble resin. Among materials disclosed as thickeners are sodium polyacrylate and copolymers of acrylic monomers.

Trommsdorff et al. have disclosed, in U.S. Pat. No. 2,326,078, the synthesis of polymethacrylic acid and copolymers of methacrylic acid and other acrylic monomers. The products are broadly disclosed as having utility as dispersing, emulfifying, thickening, sizing and binding agents.

Ethylene-crotonic acid copolymers have been proposed as being useful as emulsifiable agents by Miles et al., in U.S. Pat. No. 3,392,131.

Gregorian et al. (U.S. Pat. No. 4,118,526) have proposed foamable fabric-treating agents containing polyacrylic acid and copolymers of acrylic acid as thickeners.

Straka has proposed, in U.S. Pat. No. 4,102,808, as cellular product, such as a butadiene-styrene copolymer containing amide, ester or acid groups, in which the additives include magnesium di(lauryl sulfate), polyalkoxylated glycerol and a quaternary dihydroimidazole derivative, as well as a filler and a polyacrylate thickener.

The use of a latex, sodium lauryl sulfate and a filler, along with other ingredients, in foamable composition is contemplated by Lindquist et al (U.S. Pat. No. 3,738,359) and Roberts et al. (U.S. Pat. No. 3,538,025).

Fairclough (U.S. Pat. No. 2,858,282) has disclosed that sodium polyacrylate is a component of a latex formulation.

Although a variety of foaming aid compositions are known for foaming latex compositions containing high levels of pigments, it will be apparent that the development of frothing aid compositions permitting lower froth times than heretofore or using lower levels of additives would be highly desirable.

It is therefore an object of this invention to provide improved frothing aid compositions, which are characterized by very rapid frothing behavior and which use lower levels of additives to achieve the same degree of frothing as otherwise obtainable.

DISCLOSURE OF INVENTION

In one aspect, this invention relates to an improved frothing aid composition for use in combination with sodium polyacrylate viscosity regulator consisting of 70 to 99% by weight of a surfactant and from about 1–30% by weight of a thickener comprising a copolymer of acrylic or methacrylic acid with at least one copolymerizable monomer selected from the group consisting of alkyl acrylates or methacrylates having up to 6 carbons in the alkyl, vinylidene aromatic monomers and aliphatic conjugated diene monomers of 4–10 carbon atoms.

This invention also relates to a frothing aid composition comprising a 1–30% by weight of a thickener copolymer of acrylic or methacrylic acid with at least one copolymerizable monomer selected from the group consisting of alkyl acrylates or methacrylates having up to 6 carbon atoms in the alkyl, vinylidene aromatic monomers and aliphatic conjugated diene monomers of 4–10 carbon atoms, in admixture with 70–99% by weight of a surfactant.

This invention further relates, in the preparation of foams by beating an elastomer polymeric latex with a filler with air, to the improvement wherein a frothing aid comprising 70–99% by weight of a surfactant and 1–30% by weight of a thickener copolymer of acrylic or methacrylic acid with at least one copolymerizable monomer selected from the group consisting of alkyl acrylates or methacrylates having up to 6 carbon atoms in the alkyl vinylidene aromatic monomers and aliphatic conjugated diene monomers of 4–10 carbon atoms is mixed with the elastomeric latex and filler and sodium polyacrylate viscosity regulator is added to the mixture with beating, until a predetermined viscosity level is achieved.

In another aspect, this invention relates to a composition, foamable by beating with air, comprising an elastomeric polymeric latex, a filler, the foregoing frothing aid, and sodium polyacrylate viscosity regulator.

"Sodium polyacrylate," as used in the specification and claims, is a commercially-available material. Typical of the products which can be used is Paragum 147, obtainable from Para-Chem Southern, Inc. The material is a slightly opaque solution or dispersion containing 12.5–13.0% by weight of solids. The pH of this material is 8.5–9.5 and the viscosity at this solids level is a maximum of 25,000 cps. The amount of sodium polyacrylate used in accordance with the practice of this invention is that which raises the viscosity of the resulting foam to the required level. Generally, foams or froths made by the practice of this invention will have a minimum acceptable viscosity of 12,000–14,000 cps (Brookfield).

"Surfactant," as used in the specification and claims, can include alkali metal and ammonium salts of sulfate esters of fatty alcohols of 8–22 carbon atoms; sulfosuccinate and sulfosuccinamate surfactants; alkali metal and ammonium salts of fatty acids of 8–22 carbon atoms; alkali metal salts of sulfated alpha-olephins of 8–40 carbon atoms; alkali metal and ammonium salts of alkylbenzene sulfonates; alkanolamides of fatty acids of 8–22 carbon atoms; poly(ethylene oxide) derivatives of alcohols and alkylphenols, including the corresponding sulfated alcohols; and poly(ethylene oxide) derivatives of fatty amines of 8–22 carbon atoms or corresponding sulfated derivatives.

Salts of sulfated esters of fatty alcohols, described above, include salts of organic amines as well as ammonium salts. Preferred members of this group include materials derived from lauryl alcohol. A particularly preferred surfactant is sodium lauryl sulfate (SLS).

Sulfosuccinate and sulfosuccinamate surfactants are esters or ester-amides derived from sulfosuccinic acid. Typical of the products of this class is sodium dioctylsulfosuccinate, commercially known as Aerosol OT 75.

Salts of fatty acids of 8–22 carbon atoms include the salts of the alkali metals, ammonia and amines. Preferred members of this group will have 14–18 carbon atoms, especially sodium, potassium and ammonium salts of myristic, palmitic and stearic acids.

Alkali metal salts of sulfonated alpha-olefins will consist of the sodium and potassium salts. The alpha-olefins of interest are of 8–22 carbon atoms, having been sulfonated before neutralization with an alkali metal ion. A preferred product of this group is sold under the designation Siponate A-246. Chemically, this material is the sodium salt of an alpha-olefin sulfonate having 14–16 carbon atoms.

Alkylbenzene sulfonates are generally obtained by alkylating benzene with trimers or tetramers of propylene or isobutylene. The product is sulfonated and converted to a salt by treatment with an alkali metal hydroxide or carbonate, ammonium hydroxide or an amine. Preferred members of this group are salts of dodecylbenzene sulfonic acid, most preferably the sodium salt.

Alkanolamides of fatty acids are prepared by treating an acid of 8–22 carbon atoms with a dialkanolamine. The dialkanolamine is preferably diethanolamine or dissopropanolamine. The corresponding acids are preferably of 10–14 carbon atoms, particularly decanoic, lauric or myristic acids. A most preferred surfactant among this groups is lauric acid diethanolamide.

Poly(ethylene oxide) derivatives of alcohols and long chain amines, useful as the surfactant component of the compositions of this invention, are made from alcohols of 8–22 carbon atoms or corresponding amines, as well as from alkylphenols having 6–15 carbon atoms in the alkyl. Preferred surfactants among this group will have 40 moles ethylene oxide units can be derived from octylphenol.

It will be understood that the corresponding sulfate esters of the poly(ethylene oxide) derivatives can also be used.

Of the foregoing surfactants, most preferred are salts of alkanol sulfate esters, alpha-olefin sulfonates and alkanolamides of fatty acids. Particularly preferred are sodium lauryl sufate, lauric acid diethanolamide and alpha-olefin sulfonate (14–16 carbon atoms).

The amount of surfactant employed in the frothing aid compositions will be from about 70–85% by weight of the combination of surfactant and thickener, preferably less than about 1.25% by weight. The thickener used in the composition of this invention is an alkali-soluble emulsion polymer, specifically a copolymer of acrylic or methacrylic acid, with a copolymerizable vinylic monomer. Vinylic monomers include, but are not limited to, alkyl acrylates or methacrylates of up to 6 carbon atoms in the alkyl, vinylidene aromatic monomers and aliphatic conjugated diene monomers of 4–10 carbon atoms.

The thickener preferably contains 8–75% by weight of acrylic or methacrylic acid, more preferably 25–75% of the acid. Methacrylic acid is generally preferred.

Alkyl acrylates and methacrylates include methyl, ethyl, propyl, butyl, amyl and hexyl esters, including the various isomers. Preferred copolymers are those of ethyl acrylate and methacrylic acid. A commercially available ethyl acrylate-methacrylic acid copolymer which can be used in the frothing aids of this invention is Paragrum 501 (Para-Chem Southern, Inc.). This material is an alkali soluble emulsion polymer containing about 30% by weight of ethyl acrylate units. The effective equivalent weight of the translucent white emulsion is about 624. Material containing 20.0–20.5% by weight of solids has a pH of 2.5–3.5 and a Brookfield viscosity of 50–150 cps. In use, the copolymer is neutralized with a base, such as ammonia or caustic, to pH 8.0–9.0.

Vinylidene aromatic monomers include styrene, α-methylstyrene, α-ethylstyrene, vinyltoluene and the like. Preferred thickeners containing vinylidene aromatic monomers as the only monomer copolymerized with an acid monomer are copolymers of styrene and acrylic acid.

The thickener can be a terpolymer containing a diene, a vinylidene aromatic monomer, as above, and acrylic or methacrylic acid. Dienes include 1,3-dienes 4–10 carbon atoms, particularly butadiene, isoprene, piperylene and higher homologues. A preferred thickener of this type is made from butadiene, styrene and methacrylic acid, containing 50% by weight of methacrylic acid.

It will be understood that "parts by weight" in the specification and claims refers to dry, or real, ingredients, although the components of the frothing composition are in fact generally and conveniently used in the form of solutions or dispersions.

It is contemplated that thickeners other than the preferred types described above can be used in the process of this invention. For example, copolymers of maleic or crotonic acids with other monomers, including alkyl acrylates or methacrylates, as above, can be used. Monomers copolymerizable therewith, including vinyl esters, acrylonitrile or methacrylonitrile, can also be used.

In actual use, a premix of surfactant and thickener is made. In making up foamable compositions for application to a substrate, the latex is combined with the filler, after which the premix of surfactant and thickener is added. Finally the sodium polyacrylate viscosity regulator component is added. If necessary, the pH of the composition is adjusted at this point, preferably to 8.0–9.5.

In any case, it is to be understood that froth coatings made in accordance with this invention are shortlived and will be applied to a substrate and dried soon thereafter.

In the practice of this invention, the surfactant and thickener frothing aid will preferably constitute up to about 25% by weight of the overall additive composition. More preferably, the frothing additive combinations used in the practice of this invention will consist essentially of about 1–10% by weight of thickener, 20–30% by weight of surfactant and 70–80% by weight of sodium polyacrylate viscosity regulator.

Latexes with which the frothing aid compositions of this invention can be used include, but are not limited to, elastomeric latexes, particularly styrene-butadiene latexes, with or without copolymerized acrylic or methacrylic acid or their equivalents. It is to be understood that "styrene" and "butadiene" are to be considered as exemplars of vinylidene aromatic monomers and conjugated aliphatic dienes, respectively, and that other latexes based on these systems, broadly construed, can be employed.

Acrylic latexes can also be foamed successfully, using the frothing compositions of this invention.

A variety of fillers can be used in conjunction with the foregoing latexes. However, calcium carbonate and various types of clays are generally used. A particularly desirable characteristic of foams made in accordance with this invention is that very high solids loadings, about 80%, can be achieved. Economically important advantages of making foams with solids loadings this high include rapid drying and the ability to run the coating system at relatively high speeds, as well as rapid foaming and decreased use of materials.

Preferred latexes for use in froth coatings of this invention will be based on styrene-butadiene copolymers, including those with acrylic or methacrylic acid. A filler of choice is calcium carbonate. It is possible using the teachings of this invention, to employ 350-450 parts by weight of filler per 100 parts by weight of elastomer, at 80-85% total solids.

The foamed latexes made in the process of this invention are useful in the froth coating of carpets, upholstery and draperies. The filler-latex-frothing aid composition is applied to a level of 18-22 ounces per square yard of carpet backing or other substrate. Room temperature curing is feasible. However, it is generally preferred to cure the froth coating in an oven, with the upper temperature in the oven being limited only by the softening point of the resin in the latex. In most cases, temperatures of 300°-400° F. can be employed for the drying step, without blistering of the froth.

In the test data given in the Examples below, the ratios of Brookfield viscosities at varying spindle speeds are a measure of how the foamed material will flow on a substrate. A general correlation is that materials having froth flow indices above about 7-8 will perform acceptably under conditions in a carpet mill or upholstery factory.

DESCRIPTION OF A PREFERRED EMBODIMENT

In a most preferred case, the frothing aid composition is one consisting essentially of 15-30% by weight of thickener, 70-85% by weight of surfactant, which is combined with 70-80% by weight of sodium polyacrylate provided that the surfactant is sodium lauryl sulfate and the thickener is a copolymer of ethyl acrylate and methacrylic acid.

In frothable compositions, a most preferred latex-filler system is a copolymer of a vinylidene aromatic monomer and an aliphatic conjugated diene of 4-10 carbon atoms, containing calcium carbonate, with which is used the foregoing frothing aid composition.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius. Unless otherwise indicated, all parts and percentages are by weight.

EXAMPLE 1

Froth aid for use in making carpet backings was prepared by mixing sodium lauryl sulfate (SLS) and ethyl acrylate-methacrylic acid copolymer (30:70).

Latex (styrene-butadiene-acrylic acid copolymer) was combined with $CaCO_3$ filler. To this was added the SLS and copolymer. Finally, sodium polyacrylate was added.

The resulting mixtures were beaten using a Hobart N-50 mixer, fitted with a wire whip and running at high speed. In the results given below, the amount of time required to double the volume of the charge is called froth time. After the volume had doubled, the froth was refined by running the mixer at a lower speed for 180 seconds.

Flow index is the ratio of viscosity taken with a Brookfield RVT viscosimeter (No. 5 or No. 6 spindle at 1 rpm), divided by the viscosity at 20 rpm. The viscosity recorded is that at 20 rpm.

The amounts of materials used in each run were varied within the ranges:

|  | % real | wt. (real) | wt. in g |
| --- | --- | --- | --- |
| Carboxylated SBR | 50 | 100.0 | 200.0 |
| $CaCO_3$ | 100 | 400.0 | 400.0 |
| SLS | 30 | 0.75-1.00 | 2.5-3.3 |
| Ethyl acrylate-methacrylic acid copolymer (30:70) Paragum 501 | 20 | 0-0.25 | 1-1.25 |
| Sodium polyacrylate Paragum 147 | 12 | to 14,000 cps viscosity | |
| Water | | to 82% solids | |

Results for the following (dry weight) were:

|  | A | B | C |
| --- | --- | --- | --- |
| Carboxylated SBR | 100 | 100 | 100 |
| $CaCO_3$ | 400 | 400 | 400 |
| SLS | 0.75 | 0.90 | 1.0 |
| Paragum 501 | 0.25 | 0.10 | — |
| Paragum 147 | 0.29 | 0.47 | 0.68 |
| Total additives | 1.29 | 1.47 | 1.68 |
| Viscosity as made, cps (#5 spindle) | 14,000 | 13,600 | 14,000 |
| Froth flow index as made (#5 spindle) | 9.9 | 8.8 | 8.7 |
| Froth viscosity, cps (#6 spindle) | 18,400 | 25,000 | 26,200 |
| Froth flow index (#6 spindle) | 8.7 | 7.4 | 8.4 |
| Froth time (sec) | 150 | 135 | 180 |

These experiments show that use of the ethyl acrylate-methacrylic acid copolymer to replace some of the sodium polyacrylate in combination with SLS, both increases the frothing rate and decreases the amount of viscosity regulator and of total additives to achieve comperable viscosity properties.

EXAMPLE 2

Experiments showing the effect of varying the surfactant were done in a system using 100 dry parts of styrene-butadiene copolymer (as the latex) and 400 dry parts of calcium carbonate. The total solids level was about 83%. The system studied included sodium polyacrylate viscosity regulator with or without ethyl acrylate-methacrylic acid copolymer. The amount of sodium polyacrylate was that required to reach 12,000 cps viscosity (No. 5 spindle).

Results are given in Table I. Inclusion of the ethyl acrylate-methacrylic acid copolymer consistently lowers the time for frothing to reach the 1:1 blow ratio and permits use of smaller amounts of froth aids than otherwise.

EXAMPLE 3

Experiments were run as in Example 2, except that various acidic copolymers ere studied as thickeners. Results are given in Table II.

The results in Table II show that use of acidic copolymers of several varieties improves froth time and permits use of a lower additive level to reach the same viscosity leve. However, styrene acrylic acid copolymers and ethyl acrylate methacrylic acid copolymers are superior to styrene-butadiene-methacrylic acid copolymers.

EXAMPLE 4

Batches of clay slurry were made from:

| | parts by weight |
|---|---|
| Water | 71.4 |
| Dispersant (40%) | 0.6 |
| ASP 170 (100%) clay | 60.6 |
| Glomax LL (100%) clay | 42.2 |
| Ti pure R-960 (100%) | 35.5 |

TABLE I

| | Parts by weight (solids) | | | | | | | | | | | | | |
|---|---|---|---|---|---|---|---|---|---|---|---|---|---|---|
| | Run | | | | | | | | | | | | | |
| Material | A | B | C | D | E | F | G | H | I | J | K | L | M | N |
| SBR Latex | 100 | 100 | 100 | 100 | 100 | 100 | 100 | 100 | 100 | 100 | 100 | 100 | 100 | 100 |
| CaCO$_3$ | 400 | 400 | 400 | 400 | 400 | 400 | 400 | 400 | 400 | 400 | 400 | 400 | 400 | 400 |
| Sipex JKB$^{(a)}$ | 0.75 | 1.0 | | | | | | | | | | | | |
| Paragum 501$^{(c)}$ | 0.25 | — | 0.25 | — | 0.2 | — | 0.25 | — | 0.2 | — | 0.25 | — | 0.2 | — |
| Paragum 147$^{(b)}$ | 3.20 | 5.04 | 3.20 | 10.93 | 3.13 | 4.16 | 3.0 | 12.20 | 5.1 | 7.6 | 2.88 | 12.07 | 2.8 | 3.43 |
| Aerosol OT 75$^{(d)}$ | | | 0.75 | 1.0 | | | | | | | | | | |
| Siponic F-400$^{(e)}$ | | | | | 0.8 | 1.0 | | | | | | | | |
| Emid 6541$^{(f)}$ | | | | | | | 0.75 | 1.0 | | | | | | |
| Siponate A-146$^{(g)}$ | | | | | | | | | 0.8 | 1.0 | | | | |
| Siponate A-246$^{(h)}$ | | | | | | | | | | | 0.75 | 1.0 | | |
| SLS | | | | | | | | | | | | | 0.8 | 1.0 |
| Total froth aids | 4.20 | 5.04 | 4.20 | 11.93 | 4.13 | 5.16 | 4.00 | 13.20 | 6.1 | 8.6 | 3.88 | 13.07 | 3.8 | 4.43 |
| Total (min.) to froth to 1:1 blow ratio | 3:10 | 4:30 | 2:10 | 2:40 | 5:45 | 8:00 | 3:00 | 4:55 | 2:50 | 4:10 | 2:00 | 2:10 | 3:20 | 4:50 |

$^{(a)}$Sodium lauryl ether sulfate;
$^{(b)}$Sodium polyacrylate;
$^{(c)}$Methacrylic acid-ethyl acrylate (70:30) copolymer;
$^{(d)}$Sodium dioctyl sulfosuccinate;
$^{(e)}$Octylphenol-ethylene oxide reaction product;
$^{(f)}$Lauric diethanolamide;
$^{(g)}$Ammonium lauryl sulfate;
$^{(h)}$alpha-Olefin sulfonate.

TABLE II

| | Parts by Weight | | | | | | | |
|---|---|---|---|---|---|---|---|---|
| | Run | | | | | | | |
| Material | A | B | C | D | E | F | G | H |
| SBR Latex | 100 | 100 | 100 | 100 | 100 | 100 | 100 | 100 |
| CaCO$_3$ | 400 | 400 | 400 | 400 | 400 | 400 | 400 | 400 |
| Siponate A-246 | 0.8 | 1.0 | | | | | | |
| Paragum 147 (to reach 12,000 cps) | 3.73 | 9.04 | 2.5 | 3.43 | 2.09 | 3.43 | 2.5 | 3.5 |
| Styrene, butadiene, methacrylic and copolymer (50% methacrylic acid) | 0.2 | — | | | | | | |
| SLS | | | 0.8 | 1.0 | 0.8 | 1.0 | 0.8 | 1.0 |
| Styrene-methacrylic acid copolymer (50:50) | | | 0.2 | — | | | | |
| Ethyl acrylate methacrylic acid copolymer (55:45) | | | | | 0.2 | — | | |
| Ethyl acrylate methacrylic acid copolymer (70:30) | | | | | | | 0.2 | — |
| Total Froth Aids | 4.73 | 10.04 | 3.5 | 4.43 | 3.09 | 4.43 | 3.5 | 4.5 |
| Time (min.) to 1:1 blow | 3:0 | 3:15 | 3:50 | 4:30 | 2:40 | 3:30 | 3:10 | 3:35 |

Slurry was combined with each of the following to produce a crushed foam coating suitable for draperies:

| | Run | |
|---|---|---|
| | A | B |
| Slurry (65%) | 210.3 | 210.3 |
| Acrylic latex (50%) | 293.2 | 293.2 |
| Sipex UB (30%) | 3.1 | 3.1 |
| Water | 39.0 | 39.0 |
| Slurry | 210.5 | 210.5 |
| Ammonium stearate (25%) | 15.0 | 29.0 |
| Paragum 501 (20%) | 5.5 | — |
| Results: | | |
| Time in mins. to foam to 1:7 blow ratio | 1:30 | 2:50 |

These results show that the frothing aid can be used for foaming compositions containing an acrylic latex and clay filler. This is a typical crushed foam drapery coating.

EXAMPLE 5

Froth upholstery coating compounds were prepared, using clay filler as in Example 4, from the following:

| | Run | |
|---|---|---|
| | A | B |
| SBR latex (50%) | 200.0 | 200.0 |
| Clay slurry (65%) | 154.0 | 154.0 |
| Sodium lauryl sulfate | 2.0 | 3.3 |

-continued

| | Run | |
|---|---|---|
| | A | B |
| (30%) | | |
| Paragum 501 (20%) | 1.0 | — |
| Paragum 147 | As required to 8000 cps (Brookfield LVT, 4 at 30 rpm) | |
| Results: | | |
| Paragum 147 required | 7.5 | 9.3 |
| Froth rate (minutes to 1:2 blow ratio) | 0:25 | 0:55 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. In a frothing aid composition for use in combination with sodium polyacrylate viscosity regulator, the improvement wherein the composition contains from about 1 to 30% by weight of an alkali-soluble thickener comprising a copolymer of acrylic or methacrylic acid with at least one copolymerizable monomer selected from the group consisting of alkyl acrylates or methacrylates having up to 6 carbons in the alkyl, vinylidene aromatic monomers and aliphatic conjugated diene monomers of 4-10 carbon atoms about 70 to 99% by weight of and a surfactant.

2. The composition of claim 1, wherein the copolymer contains 8-75% by weight of acrylic or methacrylic acid.

3. The composition of claim 1, wherein the copolymer is of methacrylic acid and ethyl acrylate.

4. The composition of claim 1, wherein the copolymer is of butadiene, styrene and methacrylic acid.

5. The composition of claim 1, wherein the copolymer is of styrene and acrylic acid.

6. The composition of claim 1, wherein the surfactant is sodium lauryl sulfate.

7. The composition of claim 1, wherein the surfactant is lauric diethanolamide.

8. The composition of claim 1, wherein the surfactant is an alpha-olefin sulfonate.

9. The composition of claim 1, wherein the surfactant and the thickener are admixed with up to 80% of sodium polyacrylate viscosity regulator.

10. The composition of claim 1, wherein the thickener is a copolymer of ethyl acrylate and methacrylic acid, the surfactant is sodium lauryl sulfate and the surfactant and thickener are admixed with up to 80% by weight of sodium polyacrylate viscosity regulator.

11. The composition of claim 1, consisting essentially of 15-30% by weight of thickener and 70-85% by weight of surfactant in the frothing aid composition, admixed with 70-80% by weight of sodium polyacrylate viscosity regulator.

12. The composition of claim 11, wherein the thickener is a copolymer of ethyl acrylate and methacrylic acid and the surfactant is sodium lauryl sulfate.

13. The composition of claim 1, wherein pH is adjusted to 8.0-9.5.

* * * * *